(12) United States Patent
Gerber

(10) Patent No.: US 7,059,761 B2
(45) Date of Patent: Jun. 13, 2006

(54) PRODUCT BLENDER AND DISPENSER

(75) Inventor: Ernest C. Gerber, Danville, IN (US)

(73) Assignee: Flavor Burst Co.,, Danville, IN (US)

(*) Notice: Subject to any disclaimer, the term of this patent is extended or adjusted under 35 U.S.C. 154(b) by 77 days.

(21) Appl. No.: 10/663,556

(22) Filed: Sep. 16, 2003

(65) Prior Publication Data
US 2005/0175767 A1  Aug. 11, 2005

Related U.S. Application Data

(62) Division of application No. 09/769,587, filed on Jan. 25, 2001, now Pat. No. 6,689,410.

(51) Int. Cl.
*B01F 7/08* (2006.01)
(52) U.S. Cl. .............. 366/181.8; 366/182.4; 366/322; 222/135; 222/145.6
(58) Field of Classification Search ............. 222/135, 222/145.6; 422/137, 225, 229; 366/76.6, 366/172.2, 177.1, 181.6, 181.8, 182.2, 182.3, 366/182.4, 318, 322, 324
See application file for complete search history.

(56) References Cited

U.S. PATENT DOCUMENTS

| 532,438 | A | * | 1/1895 | Bergquist | 261/89 |
|---|---|---|---|---|---|
| 2,919,724 | A | | 1/1960 | Anderson | |
| 3,001,770 | A | | 9/1961 | Mueller | |
| 3,130,070 | A | * | 4/1964 | Potters et al. | 427/214 |
| 3,167,031 | A | | 1/1965 | Taylor | |
| 3,251,508 | A | * | 5/1966 | Borys | 222/132 |
| 3,272,388 | A | | 9/1966 | Whitmore | |
| 3,295,466 | A | | 1/1967 | Bell et al. | |
| 3,330,129 | A | | 7/1967 | Halverson et al. | |
| 3,468,265 | A | | 9/1969 | Otken | |
| 3,643,688 | A | | 2/1972 | Meinert | |
| 3,934,759 | A | | 1/1976 | Giannella et al. | |
| 3,945,614 | A | | 3/1976 | Suzuki et al. | |
| 4,116,369 | A | | 9/1978 | Crowder | |
| 4,140,299 | A | * | 2/1979 | Henderson et al. | 366/181.7 |
| 4,184,613 | A | | 1/1980 | Kinney | |
| 4,467,941 | A | | 8/1984 | Du | |
| 4,676,401 | A | | 6/1987 | Fox et al. | |
| 4,793,520 | A | | 12/1988 | Gerber | |
| 4,795,061 | A | | 1/1989 | Peckjian | |
| 4,881,663 | A | | 11/1989 | Seymour | |
| 5,145,092 | A | | 9/1992 | Shannon | |
| 5,653,157 | A | | 8/1997 | Miller | |
| 5,725,125 | A | | 3/1998 | Bessette et al. | |
| 5,778,761 | A | | 7/1998 | Miller | |
| 5,799,832 | A | | 9/1998 | Mayo | |
| 5,948,461 | A | | 9/1999 | Miller | |
| 5,954,235 | A | | 9/1999 | Schroeder et al. | |
| 5,960,701 | A | | 10/1999 | Reese et al. | |
| 6,068,875 | A | | 5/2000 | Miller et al. | |
| 6,099,159 | A | * | 8/2000 | Yoshida et al. | 366/156.1 |
| 6,242,037 | B1 | | 6/2001 | Vincent | |
| 2002/0075754 | A1 | * | 6/2002 | Huber et al. | 366/152.1 |

* cited by examiner

*Primary Examiner*—David Sorkin
(74) *Attorney, Agent, or Firm*—Woodard, Emhardt, Moriarty, McNett & Henry LLP

(57) ABSTRACT

A command module, draw switch, blending and dispensing assembly, and multiple ingredient storage and delivery modules are added to a conventional milk shake freezer and dispensing machine. A selector panel is provided to enable the operator to dispense a shake-like product according to a customer flavor or mix order, upon raising the standard draw handle on the original dispenser head of the conventional machine. The blending and dispensing assembly includes a high speed auger with backflow inducers for blending and moving the base and ingredient product.

4 Claims, 5 Drawing Sheets

PRODUCT BLENDER AND DISPENSER

This is a divisional patent application based on patent application Ser. No. 09/769,587, filed Jan. 25, 2001 now U.S. Pat. No. 6,689,410 and allowed Aug. 5, 2003.

BACKGROUND OF THE INVENTION

1. Field of the Invention

This invention relates generally to dispensing apparatus for flavored food products, and more particularly to a mix of a relatively thick flowable base blended with one or more additional ingredients to provide a dispensed product having desired color, flavor, taste, aroma and/or texture according to selectable menus.

2. Description of Prior Art

U.S. Pat. No. 4,793,520 issued to me on Dec. 22, 1988 disclosed a device for use with conventional dispensing machines to add flavor, color, and a decorative feature to the frozen food being dispensed such as a soft-serve type of ice cream. Prior to dispensing the ice cream base mix, the person operating the machine selects one of eight flavors by operating a flavor selector switch. Then, upon pulling the discharge valve operator lever, the ice cream mix with selected syrup is delivered into a cup or cone as desired by the customer. A change of syrup for the next dispensing event is accomplished by operating a switch associated with the different syrup to be dispensed. While this patented device is effective for placement of a selected syrup in and on a frozen confection, it is also desirable to be able to blend flavors into a confection base.

U.S. Pat. No. 4,676,401 to Fox et al. discloses a device using blades 33 to whip into foam, a concentrate and diluent, for a dispensed beverage. The Giannella et al. U.S. Pat. No. 3,934,759 discloses a multiple dispensing head for attachment to milk shake freezer machines instead of a conventional dispenser head, and provides for injection under pressure of an unflavored base such as milk shake mix and selected flavor syrup together into a premix chamber and then moved to a chamber where they are to be thoroughly mixed by motorized blades and forced downward through a dispensing nozzle into a serving container. The Seymour U.S. Pat. No. 4,881,663 discloses a soft ice cream dispensing apparatus having a multi-channel pump to direct a selected syrup or selected combination of syrups from reservoirs to a syrup nozzle head from which a plurality of nipples extend into the flow of soft ice cream. The operator may choose to dispense pure unvariegated soft ice cream or select any one of a plurality of different syrups to be introduced into the ice cream as it is dispensed. The Miller et al. U.S. Pat. No. 5,778,761 provides apparatus for dispensing pre-packaged neutral flavored mix stored within a serving cup, maintaining it at a pre-selected temperature so that syrups of one or more flavors can be added into the serving cup and mixed in the cup at the point of use.

It is an object of the present invention to provide apparatus and a method which, by simply attaching the apparatus to a standard, commercially available, confection freezing and dispensing machine, is useful for blending ingredients according to various recipes into a confection base, to produce and dispense the desired product.

SUMMARY OF THE INVENTION

According to a typical embodiment of the present invention, apparatus are provided for attachment to the dispensing head of a conventional machine for receiving a semi-liquid flowable base mix, and easily selecting and introducing one or more ingredients, and thoroughly blend such ingredients into the base mix to provide some feature or features detectable by the senses, such as color, flavor, aroma, taste or texture desired in the product dispensed into a serving container. Another aspect of the invention is establish a limited backflow of the base material and injected ingredients during movement from the machine dispenser head to the apparatus dispensing outlet for thorough blending of the base material and selected ingredients.

DESCRIPTION OF THE PREFERRED EMBODIMENT

Figure 1:
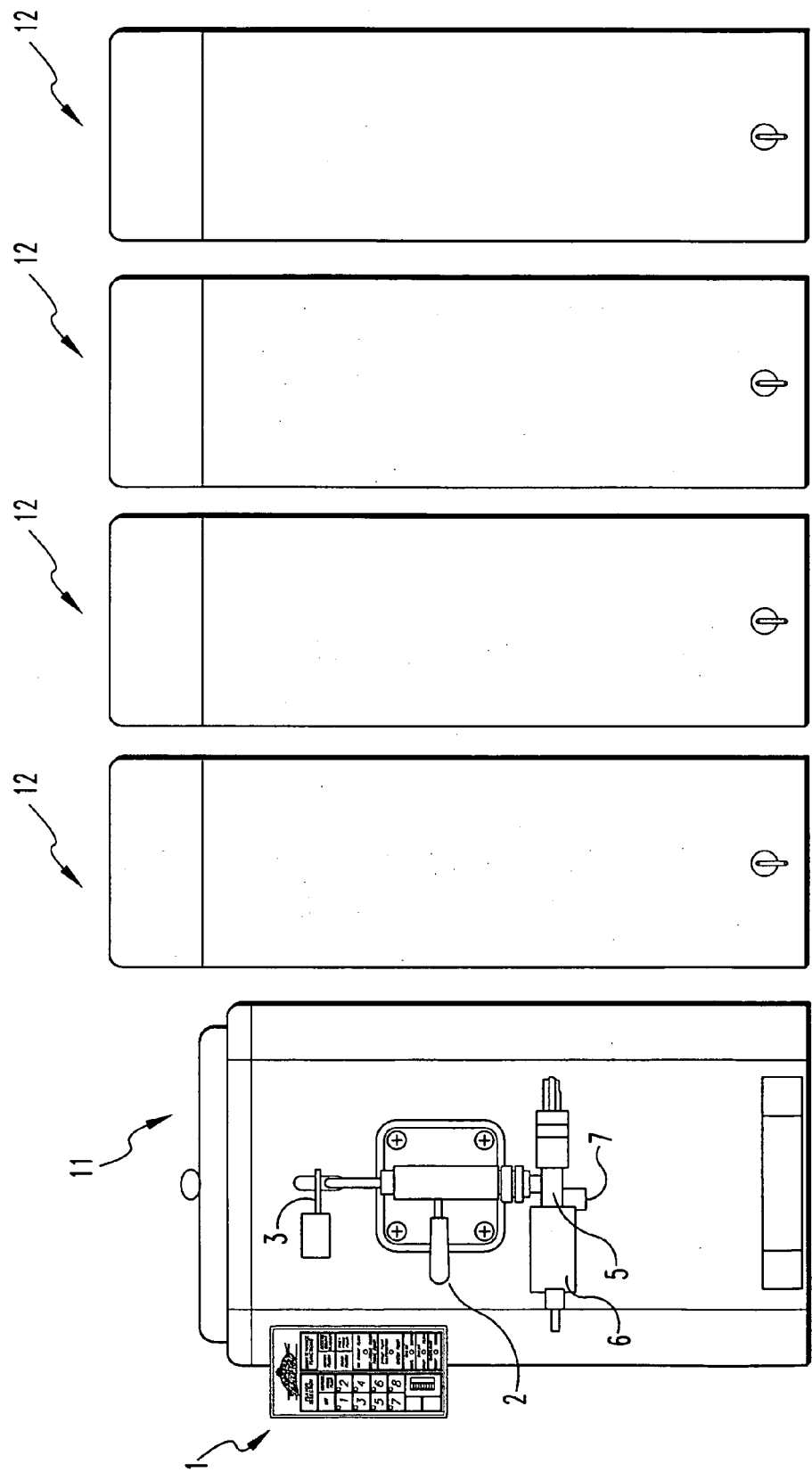
FIG. 1 is an elevational view of the apparatus capable of providing a dispensed product incorporating any one or combination of 32 different ingredients.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 4:
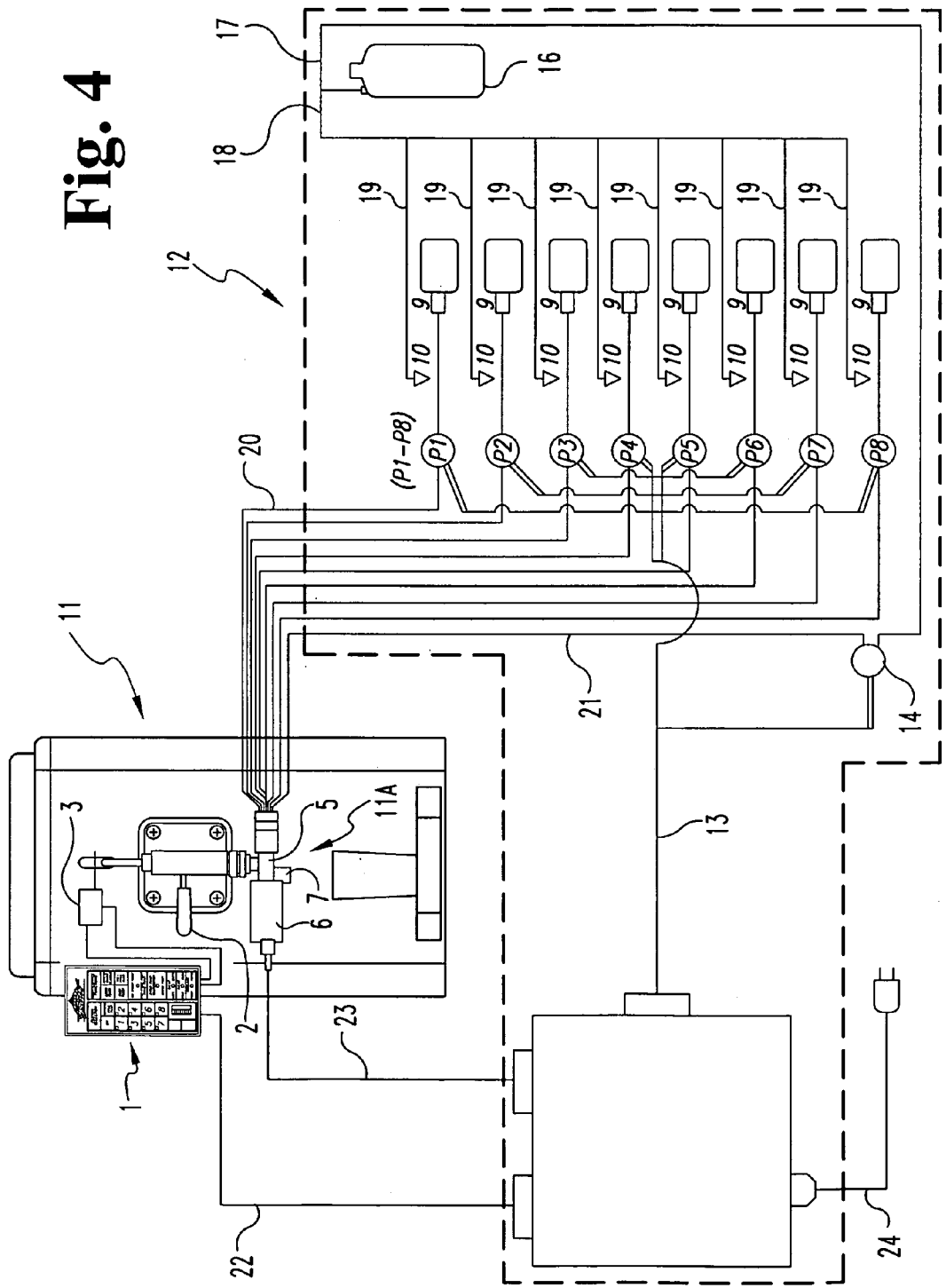
FIG. 4 is a diagram of the electrical and ingredient feed system.

Referring first to FIGS. 1 and 4, a standard, commercially available confection freezer and dispenser assembly 11 is shown. This assembly 11 is normally mounted on a stand, cabinet or counter and has a tray on the front near the bottom and which receives a serving cup under the dispensing head of the freezer assembly. According to the illustrated embodiment of the invention, a command module 1, draw switch 3, blending and dispensing assembly 11A, and ingredient storage and delivery module 12 are added to the conventional assembly 11. The standard draw handle 2 is associated with the draw switch. The assembly 11A is mounted to the standard freezer dispensing outlet and has a blending chamber 5 in it, a blending auger, auger drive motor 6 and a discharge outlet 7 to dispense the desired product into the serving cup when the handle 2 is raised to draw base material from the freezer.

The ingredient storage and delivery module 12 is coupled to the freezer 11 in several ways. It includes an ingredient supply labeled as "syrup supply" in FIG. 4 and which typically comprises eight containers 9 containing different ingredients. Tubes such as 9T have quick-connect fittings for connection to containers 9, and the other ends of the tubes are connected to pumps P1 through P8 for withdrawing ingredients from the containers 9 and pumping them into the blender chamber 5 of the blending assembly 11A. The module 12 also includes the microprocessor-based controller 4 having a power cable output 13 containing nine pairs of electrical conductors, eight separate pairs being connected separately to pumps P1–P8 and one pair being coupled to the sanitizer pump 14. The unit 12 also contains a supply of sanitizing solution at 16. One outlet conduit 17 from container 16 leads to the intake side of the sanitizer pump 14. Another outlet line 18 from the sanitizer supply 16 is branched at eight locations with tubes 19 having quick-connects 10 for connection individually to the inlet of pumps P1–P8 for sanitizing the pumps and discharge lines from them through the blender chamber 5 and outlet 7, when desired. Similarly, a discharge line 21 is connected from the sanitizer pump 14 to the blending and dispensing assembly 11A and thereby through the blending chamber 5 and discharge outlet 7 for sanitizing these components, when desired.

There is a command cable 22 from the command module to the microprocessor controller 4 and a power cable 23 from the controller to the blender motor 6. A power input cable 24 is provided for the controller 4.

Figure 2:
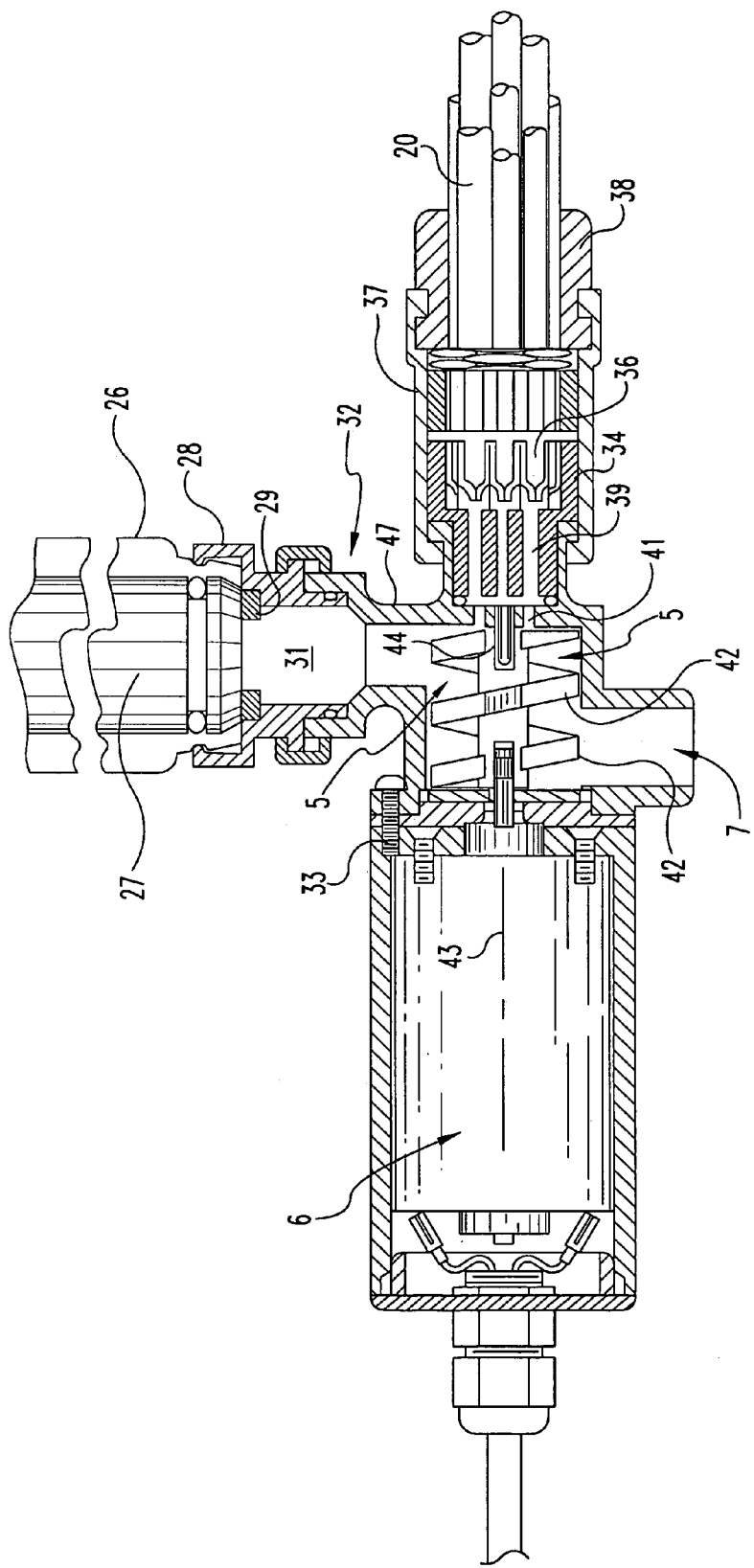
FIG. 2 is a section through the dispensing head assembly.
Figure 3:
FIG. 3 is an end view of the blending auger of the assembly of FIG. 2.

Now referring specifically to FIG. 2, the freezer outlet 26 contains a valve plunger 27 which, when raised, enables discharge of a base material mix from conventional storage in the freezer 11 downward through the outlet 26. The blending and dispensing assembly 11A includes the outlet adapter portion 28 which snaps onto the lower end of the standard freezer outlet 26, with the internally directed circumferential ridge of the adapter 28 being received in an external circumferential groove in the freezer outlet 26. The adapter 28 may be provided with a flow choke 29 in passageway 31. The blender housing 32 may be integral with or a separate piece clamped and sealed (as shown) and has the blending chamber 5 therein. The blender drive motor 6 has the housing thereof fastened by screws such as at 33 to the blender body. The housing 32 also has a right hand end opening receiving a manifold 34 which includes a plurality of duck-bill valves 36 therein for each of the ingredient supply lines such as 20, with the assembly having a snap lock fitting receiver 37 for reception of the supply line fitting 38 to connect and seal the passageways from lines 20 through the one-way valves 36 into the manifold and through passageways such as 39 therein and blender housing ports such as 41 into the blending chamber 5.

The blender motor 6 drives a blending member which is unique in several respects. First of all, it moves the base material flowing from the freezer outlet 26 through the blender chamber toward the outlet 7. But it moves the material in a somewhat inefficient way, permitting some backward flow of some material as the material is moved from the chamber 31 to the outlet 7. In the illustrated example movement is accomplished by using an auger 42 in the form of a screw. In the illustrated example this screw has only one thread or flight and it is interrupted by radially outwardly opening slots 46 located every 90 degrees around the longitudinal axis 43 of the auger. One end of the auger is splined to the motor shaft and the other end is received and freely rotatable on a locator axle 44 fixed in the wall of the blender housing. The backflow is caused by the restriction to flow of medium from the blending or mixing chamber 5 outlet, causing back pressure against rotation of the auger. The back pressure causes backflow of medium through the openings in the auger flighting. The back flow of the medium causes the medium to remain in the mixing chamber 5 longer, allowing the turbulence of the high speed rotation (3500–6000, preferably about 4000–5700, rpm) of the auger to blend the ingredients. When attached to a shake machine such as Taylor Model # 430, the blending assembly auger may be about one inch long and $15/16^{th}$ inches in diameter, with a helical flight lead of about 3/8 inch. The slot width may be about 0.250 inch and depth from periphery to slot bottom of about 0.300 inch. The auger may be rotated at about 4000 rpm with a 0.500 inch inside diameter of outlet 7. This is just an example believed to produce a product movement efficiency of about 65% with a backflow of about 35%. For a base of greater viscosity than shake mix, such as soft serve ice cream mix, a greater slot width and rotational speed may be needed to get suitable blending of low-viscosity ingredients in the base.

The base and blending ingredient back flow is provided by the blending slots 46 in the auger screw thread as the motor rotates the auger. Arrangements other than a helical thread with slots may also be used, the point being to enable suitable back flow of the base being blended with one or more ingredients introduced through the valves 36.

To facilitate flow of blended product from the outlet 7 after the draw handle is lowered, a one-way valve 47 is provided in the blender body 32 to admit air to the passageway above the blending chamber 5 but, of course, prevent any base mix from being discharged at that location.

OPERATION

Figure 5:
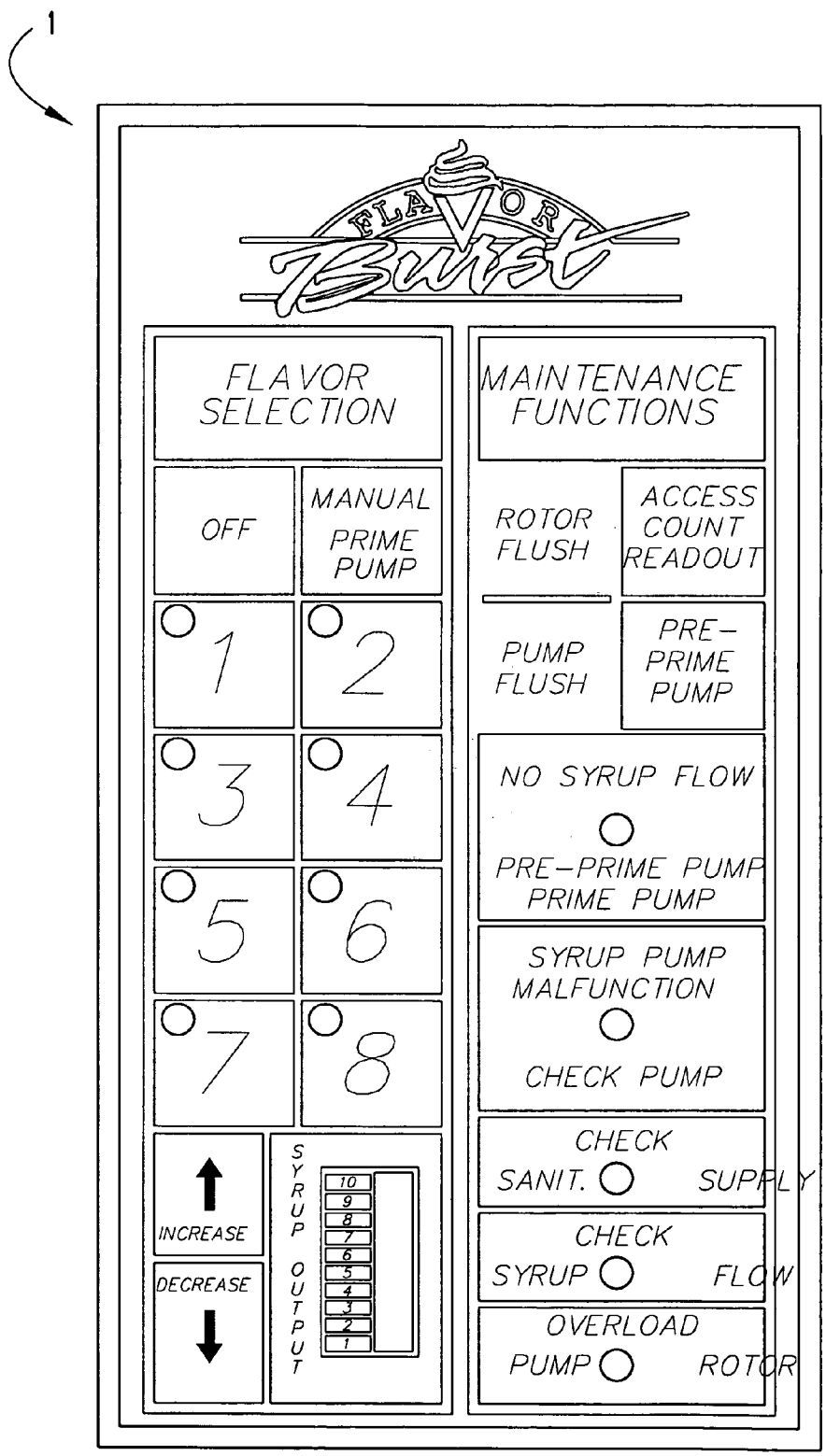
FIG. 5 is a view of the dispenser operating panel according to one embodiment.

In operation of the invention, and referring to FIG. 5 along with the previously mentioned figures, the procedure is as follows:

1. The operator selects the desired flavor from the number (1–8) on the command module (1).
2. The draw valve of the freezer is opened by rotating the draw handle (2) from left to right, causing the draw valve plunger 27 to rise.
3. As the freezer draw valve plunger rises, frozen mix is forced from the freezer into the blender chamber (5). Concurrently, the draw switch lever (3) is forced upward, closing the switch and completing the circuit to the microprocessor (4). The flavor selection command is thus forwarded to the microprocessor and the selected corresponding syrup pump (P1–P8) begins to rotate, pulling syrup from the syrup supply and forcing it into the blending chamber (5).
4. At the same time that the draw valve plunger rises, allowing the frozen mix into the blender chamber, the selected syrup also is being forced into the blender chamber. The blender motor (6) also begins to rotate the blending auger 42, causing the frozen mix and the syrup to thoroughly mix together.
5. The flavored mix is then forced out of the blender opening (7) into the serving cup.
6. When the draw is completed, the operator rotates the draw handle (2) back to the left, causing the draw valve plunger to lower, stopping the flow of frozen mix into the blending chamber (5).
7. As the plunger lowers, the draw switch lever lowers, opening the switch circuit and causing the syrup pump (P1–P8) to cease operating, stopping the flow of syrup into the blending chamber (5).
8. Also, when the draw switch is opened, the blender motor continues to operate for 2 seconds and then ceases to operate. The product draw operation is now complete.

The above steps may be repeated for as many additional servings as are desired, changing the ingredient selector for each subsequent draw, according to the desires of the customers served.

When the operator wishes to flush or rinse out the blender chamber with sanitizer solution to clean and sanitize the blender, he or she would perform the following functions:
1. The operator would touch the 'Rotor Flush' key on the command module (1).
2. The sanitizer pump 14 (sp) would begin to rotate, pulling the sanitizer solution from the sanitizer supply 16 and forcing it into the blender chamber (5).
3. At the same time, the blender motor (6) begins to rotate the blending auger, causing turbulence in the blending chamber, cleaning and sanitizing all the surfaces in the blending chamber.
4. After 3 seconds, the sanitizer pump 14 (sp) ceases to rotate, automatically stopping the flow of sanitizer into the blending chamber.
5. The blender motor (6) continues to operate for 2 seconds after the sanitizer pump stops.

When the operator wishes to flush or sanitize any of the eight syrup pumps with sanitizer solution, he or she would perform the following functions:
1. The operator first disconnects the syrup line connector (9) from the syrup supply of the selected pump (P1–P8).
2. The operator then connects the flush line connector (10) to the syrup line connector (9) (these are quick connect/disconnect fittings).
3. On the Command Module (1), the operator selects the syrup pump (1–8) to flush and sanitize.
4. The operator then touches the 'Pump Flush' key on the Command Module (1).
5. The selected pump begins to rotate, pulling sanitizer solution from the sanitizer tank 16 and forcing it out of the mixing chamber outlet 7 into a waste collection container (not show).
6. The pump flush continues to operate for 5 minutes and then automatically shuts down to cease the pump flush operation. Note: The operator may cease this flushing operation at any time by touching the 'Off' key).
7. The flush line connector (10) is disconnected from the syrup line connector (9).
8. The syrup line connector (9) is reconnected to the syrup supply.
9. To prime the sanitized pump with syrup, the operator selects the corresponding syrup pump number (1–8) on the Command Module (1).
10. The operator then presses and holds down the 'Prime Pump' key on the Command Module until all of the sanitizer solution is forced from the syrup line and pure syrup emits from the blending chamber. The operator then releases the 'Prime Pump' key.
11. The sanitizing of one pump is now complete and the operator may repeat this process to sanitize other pumps.

Figure 6:
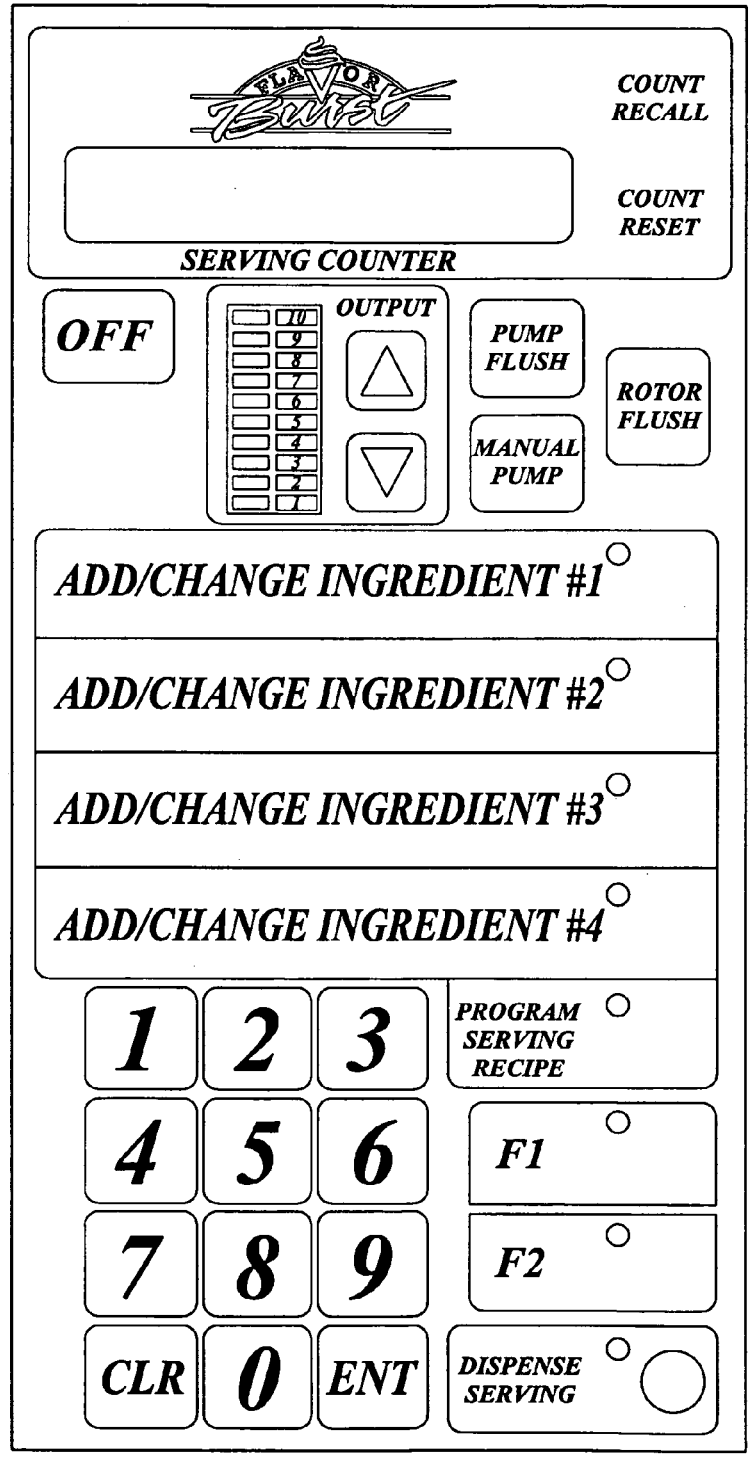
FIG. 6 is a view of a multi ingredient blend programming panel.

Now, referring to FIG. 1, it can be recognized that the system described above may be extended to provide for more than eight ingredients. By providing three more units like unit 12, such as shown in FIG. 1, a total of 32 different ingredients can be included in the mix dispensed from the outlet 7. It is expected that it would be a rare occurrence that any more than four different ingredients would be needed in a recipe for a desired product to be dispensed. For preparing the equipment for quick production to order, of shake or slush-type products according to various mixes of beverages, similar to mixed drinks, a programming module for setting up the equivalents can be arranged as in FIG. 6. Whereas the previously described module usable by the operator does enable the determination of how much of a syrup would be dispensed during a single draw of the base material, the organization useful with FIG. 6 enables selection of combinations of ingredients to be blended with the base material according to pre-programmed recipes for that purpose. Such recipes might include flavors, colors, liquids, other ingredients or combinations thereof. After decision is made about what various recipes for dispensed products are to be offered, the recipes would be stored in the electronics associated with each of the units 12. For the first recipe 1, the machine set-up person/programmer would enter the identification number for that recipe and then enter the number of each particular ingredient and the amount thereof and store that under the recipe number. Then, for the next recipe, the identification of ingredients and the amount thereof would be stored under that recipe number. The procedure would be continued with each recipe having a different two-digit identification number which could then be called up by the operator using the controller module such as 1 to select the recipe to be dispensed according to a customer order. If, and when, it is desired to change available recipes in the system, the machine set-up person can do so by using the panel such as in FIG. 6 to make the desired changes. Such an arrangement would be particularly useful in an establishment where it is desired to formulate various cocktails in a soft-serve, slush, ice or other type of product, saving the formula and then being able to access that formula whenever desired by the operator entering a two-digit code and drawing the confection.

It should be recognized that while the invention has been described with reference to a shake-type base, it is also useful with other bases including, but not limited to, slush, ice, soft serve or other base mix, and it could be used with other ingredients blended into a different but flowable base material. One example is a warm custard or a sauce. Also the base material itself need not be flavored. Therefore, while currently it seems likely that the base would be a shake, ice or frozen fruit base, others might very well be used as well. Various electronic and software combinations well within the skill of the art, can be used to implement the present invention. Also, while "keypad" or "touch pad" type of signaling for selection and programming are disclosed, other signaling means may be used. A couple of examples are light and/or voice activated signaling controls.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:
1. The combination comprising:
   a blending and dispensing assembly having an inlet end and a discharge end and a passageway communicating from said inlet end to said discharge end, said inlet end being configured to fit and seal against a base product delivery end outlet of a flowable mixture dispenser head, said assembly having a blending chamber in the passageway;
   a manifold on said assembly with multiple passageways in the manifold for delivery of fluid ingredients in a first direction from outside said assembly into said chamber;
   an auger in said blending chamber and operable, when actuated, to move a mixture from said blending chamber to an outlet at said discharge end;
   a blender motor coupled to said auger to actuate said auger;

a plurality of ingredient sources;

a plurality of ingredient conduits coupled to said manifold and to said sources to convey ingredients from said sources to said manifold;

a plurality of pumps coupled to said sources and operable, when actuated, to pump ingredients from said sources to said manifold;

a controller coupled to said pumps to signal said pumps for operation;

a selector coupled to said controller to enable said controller to initiate operation of selected pumps;

a base material dispenser having a dispenser head with a base product delivery end outlet coupled to said inlet end of said assembly and having a member operable, when actuated, to initiate flow of base product out of the delivery end outlet of the dispenser into the inlet end of the assembly; and a switch coupled to said member and to said selector to signal said controller to initiate operation of said selected pumps.

2. The combination of claim 1 and wherein:

said member is a base product draw handle and said switch is operable by said handle.

3. The combination comprising:

a blending and dispensing assembly having an inlet end and a discharge end and a passageway communicating from said inlet end to said discharge end, said inlet end being configured to fit and seal against the base product delivery end outlet of a flowable mix dispenser head, said assembly having a blending chamber in the passageway;

a plurality of ingredient sources storing different ingredients for addition to a base product in a direction from outside said assembly into said chamber;

an auger in said blending chamber and operable, when actuated, to move a mixture from said blending chamber to an outlet at said discharge end;

a blender motor coupled to said auger to actuate said auger;

a plurality of containers holding said ingredient sources;

a plurality of ingredient movers coupled to said sources and operable, when actuated, to move said ingredients from said sources toward said chamber, a controller coupled to said ingredient movers to signal said movers for operation to move said ingredients toward said chamber;

a selector coupled to said controller to enable said controller to initiate operation of selected movers;

a base material dispenser having a base material delivery end outlet coupled to said inlet end of said assembly and having a member operable, when actuated, to initiate flow of base material out of the delivery end outlet of the dispenser into the inlet end of the assembly; and a switch coupled to said member and to said selector to signal said controller to initiate operation of said selected ingredient movers.

4. The combination of claim 3 and wherein: said member is a base material draw handle and said switch is operable by said draw handle.

* * * * *